US006926531B2

(12) United States Patent
Wallaker (10) Patent No.: US 6,926,531 B2
(45) Date of Patent: Aug. 9, 2005

(54) APPARATUS FOR USE IN TRAINING AN OPERATOR IN THE USE OF AN ENDOSCOPE SYSTEM

(75) Inventor: Daniel Mark Wallaker, Gt. Wakering (GB)

(73) Assignee: KeyMed (Medical & Industrial Equipment) Limited, Southend-on-Sea (GB)

( * ) Notice: Subject to any disclaimer, the term of this patent is extended or adjusted under 35 U.S.C. 154(b) by 0 days.

(21) Appl. No.: 10/498,591

(22) PCT Filed: Dec. 11, 2002

(86) PCT No.: PCT/GB02/05607

§ 371 (c)(1),
(2), (4) Date: Jun. 10, 2004

(87) PCT Pub. No.: WO03/050783

PCT Pub. Date: Jun. 19, 2003

(65) Prior Publication Data

US 2005/0042587 A1 Feb. 24, 2005

(30) Foreign Application Priority Data

Dec. 11, 2001 (GB) .............................................. 0129593

(51) Int. Cl.[7] .............................................. G09B 23/28
(52) U.S. Cl. ........................ 434/262; 434/267; 434/272
(58) Field of Search ................................. 434/262, 272, 434/267; 345/156

(56) References Cited

U.S. PATENT DOCUMENTS 4,907,973 A * 3/1990 Hon ............................ 434/262
5,623,582 A * 4/1997 Rosenberg ................... 700/264
5,800,178 A * 9/1998 Gillio .......................... 434/262
5,805,140 A * 9/1998 Rosenberg et al. ......... 345/161
6,106,301 A * 8/2000 Merril ......................... 434/262
6,300,937 B1 * 10/2001 Rosenberg ................... 345/156
6,375,471 B1 * 4/2002 Wendlandt et al. ......... 434/262
6,538,634 B1 * 3/2003 Chui et al. ................... 345/156

FOREIGN PATENT DOCUMENTS

GB        2195808 A  *  4/1988  ........... G09B/23/28
GB        2252656 A  *  8/1992  ........... G09B/23/28

* cited by examiner

*Primary Examiner*—Jessica Harrison
*Assistant Examiner*—Dmitry Suhol
(74) *Attorney, Agent, or Firm*—Luedeka, Neely & Graham, PC (57) ABSTRACT

An apparatus for use in a simulator for an endoscopy system. The apparatus comprises a rotatable disc (2) on which a plurality of rollers (6, 7) are mounted to surround the axis of rotation (4) of the disc. A force feedback motor is provided to resist rotation of the disc (2) and a further motor (12, 13) is provided to resist rotation of at least one of the rollers. These mechanisms provide rotational and linear force feedback respectively against movement of a dummy instrument inserted along the axis (4). A separate mechanism of similar construction, but without force feedback motors is provided independently of the force feedback arrangement to provide independent linear and rotary sensing of the position of the instrument.

10 Claims, 8 Drawing Sheets

APPARATUS FOR USE IN TRAINING AN OPERATOR IN THE USE OF AN ENDOSCOPE SYSTEM

The present invention relates to an apparatus for use for training an operator in the use of an endoscope system comprising a dummy endoscope having an insertion tube; a fixture defining a duct receiving, in use, the insertion tube; sensor means responsive to manipulation of the dummy endoscope to provide signals representative of longitudinal and rotational movement of the insertion tube relative to the fixture; and simulation means responsive to the signals to generate an operator viewable image simulating the image which would be viewable using the endoscope when manipulated in like manner during an endoscopic procedure, wherein the simulation means further comprises tactile means independent of the sensor means and operable between the fixture and the insertion tube so as to provide a corresponding tactile feedback to the operator. Such an apparatus will subsequently be referred to as "of the kind described".

An example of an apparatus of the kind described is disclosed in GB-A-2252656. This document also discloses a frictional brake which is brought into engagement with the tube so as to provide a resistive force proportional to the degree of force feedback required.

U.S. Pat. No. 6,375,471 discloses a surgical simulation system with a mechanism for transmitting axial and rotational forces to a dummy instrument. In this device, a pair of pinch rollers not only transmit both the linear and rotary force feedback to the device, but also serve as the linear and rotary sensing mechanisms. Whilst such a system may work in simulations which require low levels of force feedback, they will not be suitable for an endoscopy simulation system in which a simulation such as a colonoscopy simulation require a high degree of force feedback. By using the same mechanism for force feedback and sensing, there is a real danger that the instrument will slip within the force feedback mechanism, whereupon the sensed position within the simulation is lost.

U.S. Pat. No. 5,623,582 also discloses a medical simulator. The document discloses sensors for sensing the linear and rotational position of a dummy instrument. It is stated that these sensors could be output devices to impart a force upon the dummy instrument. However, as the illustrated embodiments relate only to sensors, the interfaces between the dummy instrument and the transducers are designed for sensing purposes and are unsuitable for applying the levels of force feedback required in an endoscope system. Also, it appears that, as with U.S. Pat. No. 6,375,471, the input and output functions are carried out by the same devices and the same problems of slippage will occur. U.S. Pat. No. 5,623,582 does a disclose any practical mechanism by which the force feedback can be applied to the instrument.

Therefore, in the prior art, no-one has yet addressed the problem of how to provide a practical working device which is capable of providing independent linear and rotational force feedback to a dummy medical instrument, and particularly to instruments which require a relatively high level of force feedback.

According to a first aspect of the present invention, an apparatus of the kind described is characterised in that the tactile means comprises means to impart linear and rotational force feedback independently of one another, including a set of rollers spaced circumferentially around the duct such that the periphery of each roller engages, in use, the insertion tube and each roller is rotatable upon longitudinal movement of the tube; the rollers being arranged to grip the tube and being mounted on a disc which is rotatable upon rotational movement of the tube, a first force feedback mechanism for generating proportional resistance to rotation of at least one roller so as to provide force feedback against the longitudinal motion of tube, and a second force feedback mechanism for generating proportional resistance to rotation of the disc so as to provide force feedback against the rotational movement of the tube, wherein the rollers are configured to grip the tube so as to substantially eliminate slippage between the tube and the disc as the tube is rotated.

By providing the tactile means independent of the sensing means, the problems with the prior art are avoided. Even if the dummy instruments slips with respect to the tactile means when a high level of force feedback is applied, as the sensor means is independent, it will continue to monitor the position of the instrument. In other words, by being independent, the sensor means operates at a constant force and can be designed accordingly, while, in the prior art, the sensing means has to engage with the instrument through an ever changing degree of force.

Also, the arrangement of the rollers on the disc provides a practical solution to the problem of providing independent linear and rotational force feedback. The rollers not only fulfill the function of providing the linear force feedback to the endoscope, but also serves to transmit the rotational movement of the endoscope to the disc and also allow force feedback to be transmitted in the opposite direction.

Preferably, at least one of the rollers is spring loaded by a spring which tends to urge it into engagement with the tube. At least one roller, preferably the spring loaded one, is provided with circumferential ridges to grip the tube when transmitting rotational force feedback. The rollers preferably have a concave profile, such that the rollers engage with the majority of the circumference of the tube.

Preferably the ridges have sharp edges which deform the surface of the tube increasing the grip on the tube. The peripheral of the ridged roller is preferably rigid, while the remaining rollers are preferably rubber coated.

For optimum grip, there are preferably between five and fifteen, and ideally seven circumferential ridges. This spreads the load across the rollers so that they will not cut into the surface of the insertion tube.

Preferably the apparatus further comprises a second set of three rollers spaced circumferentially around the duct and such that the periphery of each roller engages, in use, the insertion tube, and each roller is rotatable upon longitudinal movement of the tube; the second set of rollers being arranged to grip the tube and being mounted on a second disc which is rotatable upon rotational movement of the tube; wherein one roller on each disc is connected to a motor which is arranged to generate force feedback to the roller to provide resistance to longitudinal movement of the tube, the two motors being mounted at diametrically opposed locations with respect to the axis of the tube.

With this arrangement, the linear force feedback load is spread between two motors, thereby reducing the requirement from each motor and hence reducing the likelihood of longitudinal slippage between the tube and the rollers. Further, as the motors are mounted at diametrically opposed locations, the overall mass which is required to rotate upon rotation of the tube is balanced without the need for any counterbalancing masses.

Preferably the sensor means comprises a set of sensor rollers spaced circumferentially around the duct such that the periphery of each, roller engages, in use, the insertion tube and each roller is rotatable upon longitudinal movement of the tube; the rollers being arranged to grip the tube and being mounted on a disc which is rotatable upon rotational movement of the tube.

An example of an apparatus constructed in accordance with the present invention will now be described with reference to the accompanying drawings, in which.

The apparatus is broadly as described in our earlier application GB-A-2252656. This description is therefore limited to the mechanism for detecting the longitudinal and rotational movement of the flexible insertion tube relative to the fixture, and the mechanism for applying force feedback against the longitudinal motion of the insertion tube.

The force feedback mechanism is shown in FIGS. 1 to 4.

Figure 4:
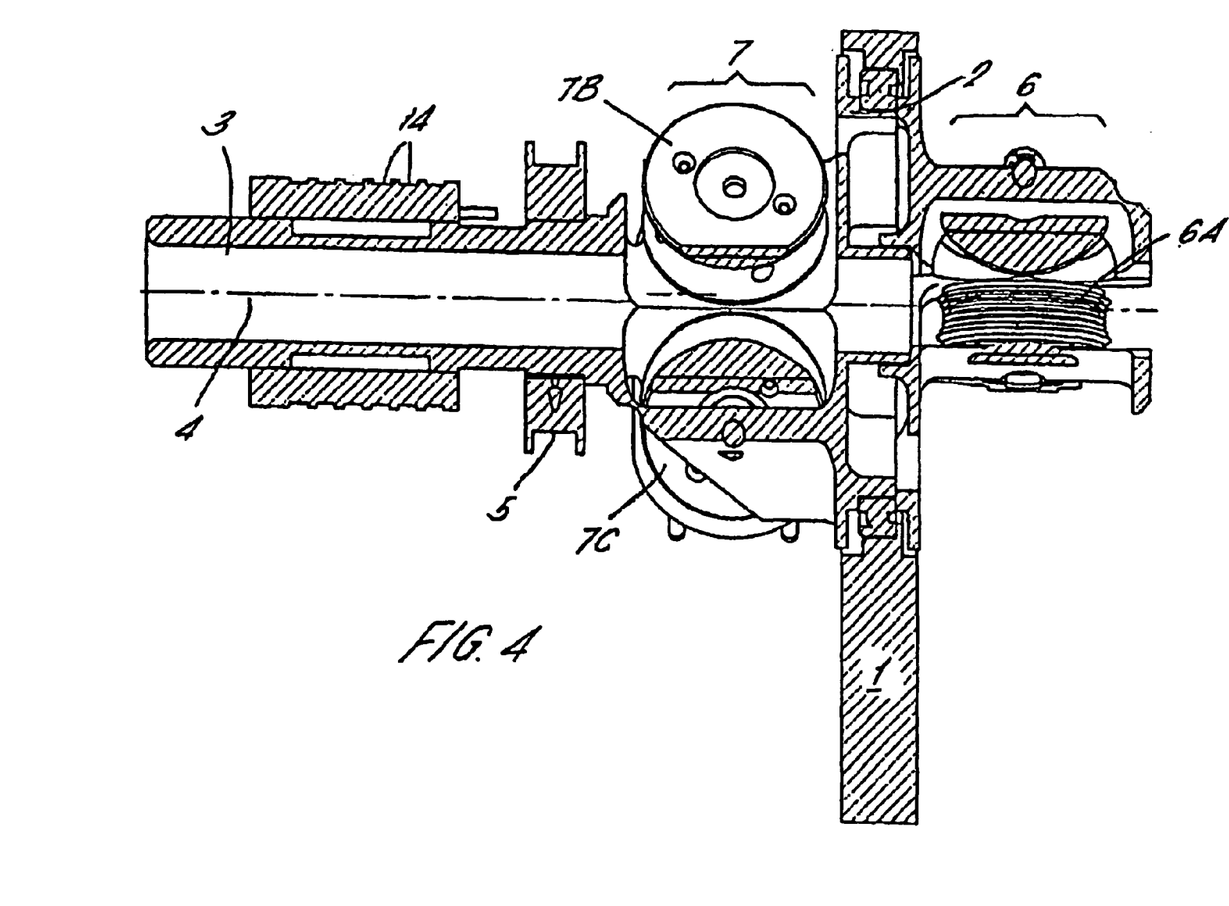
FIG. 4 is a cross-section through line IV—IV in FIG. 3.
Figure 5:
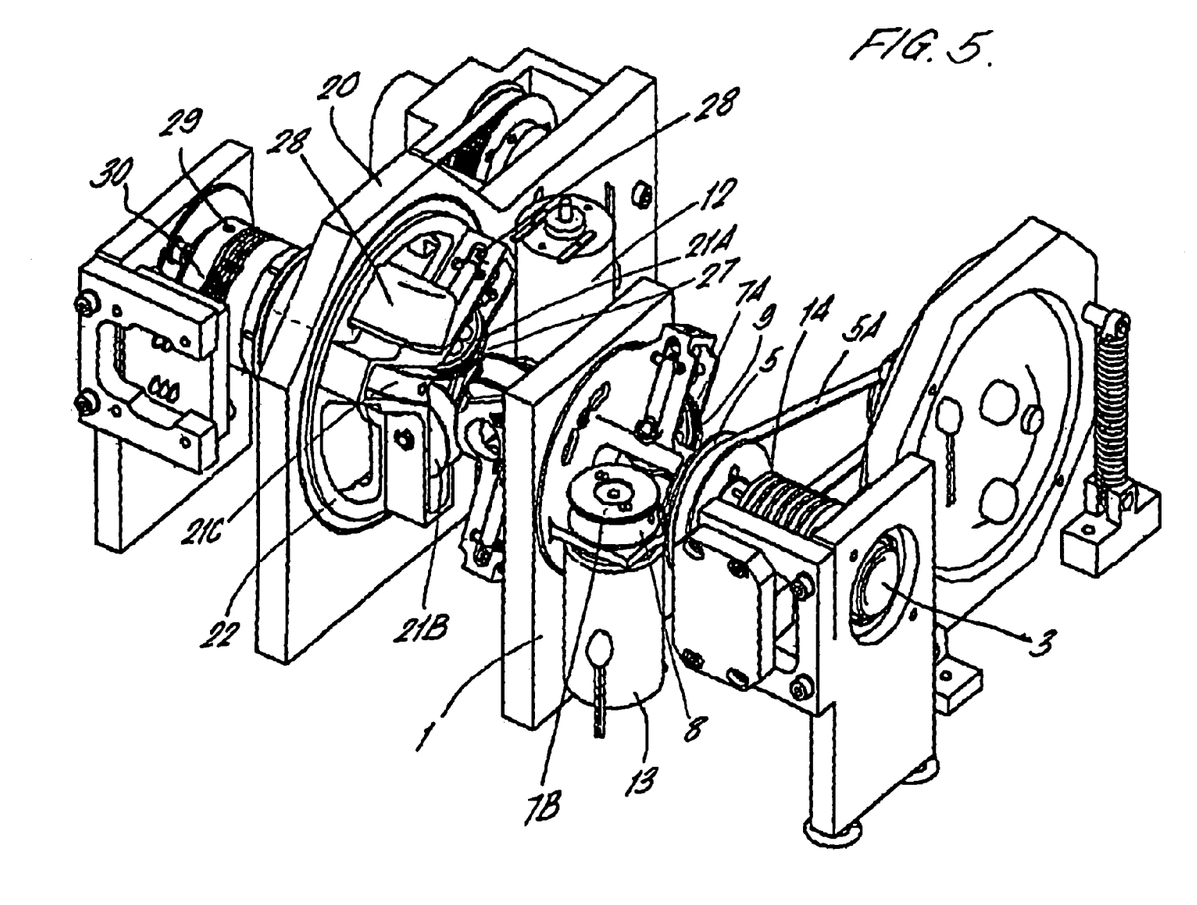
FIG. 5 is a perspective view of the force feedback and sensing apparatus.

The fixture comprises a housing 1 in which a disk 2 is rotatably mounted. A duct 3 for receiving an insertion tube extends through the entire assembly along axis 4 as best shown in FIG. 4.

Figure 8:
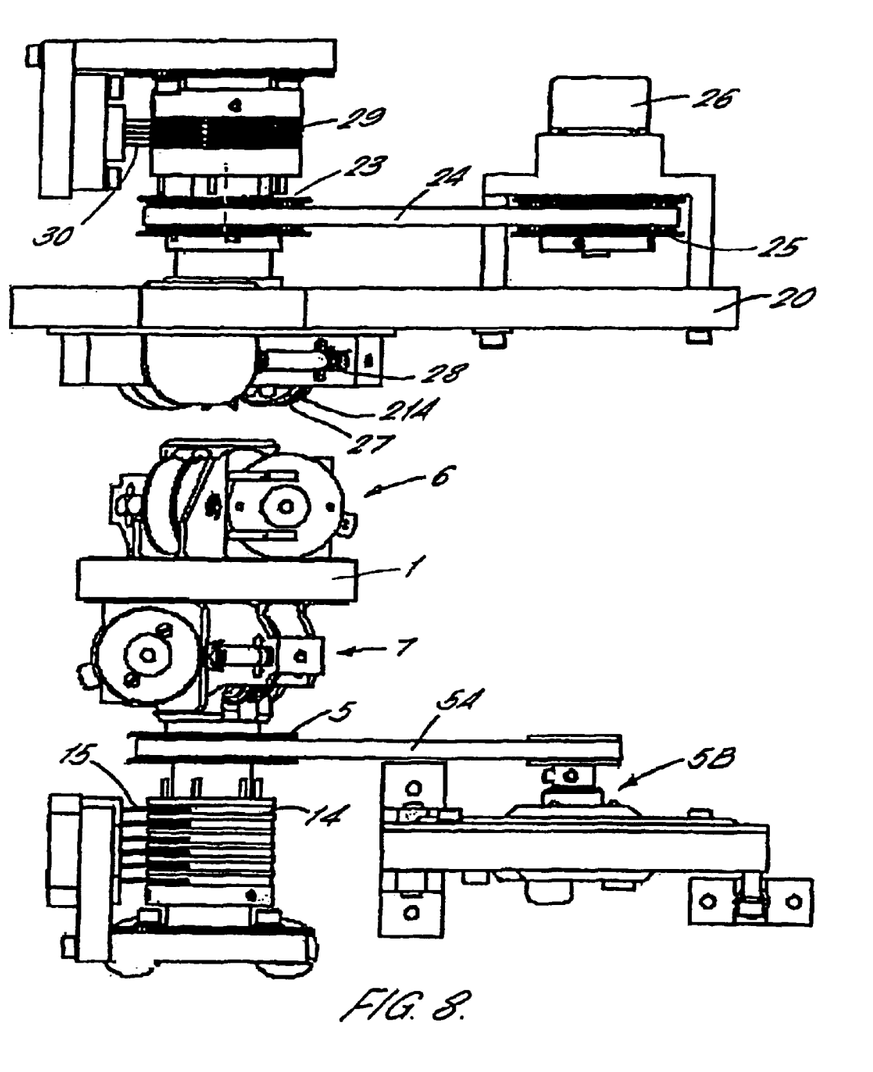
FIG. 8 is a plan view of the apparatus of FIG. 5.

The disk 2 and everything attached thereon are rotatable together about axis 4. A toothed belt 5A is provided around a pulley 5 and also around a motor 5B (FIG. 8) to transmit feedback to the insertion tube against rotation of the insertion tube about the axis 4.

A first set of three rollers 6 is mounted to the disk 2 on a first side of a housing 1, and a second set of rollers 7 are similarly attached to the disk 2 on the opposite side of the housing 1. The sets of rollers are similar in construction and operation, and only the first set of rollers 6 is described below.

Figure 1:
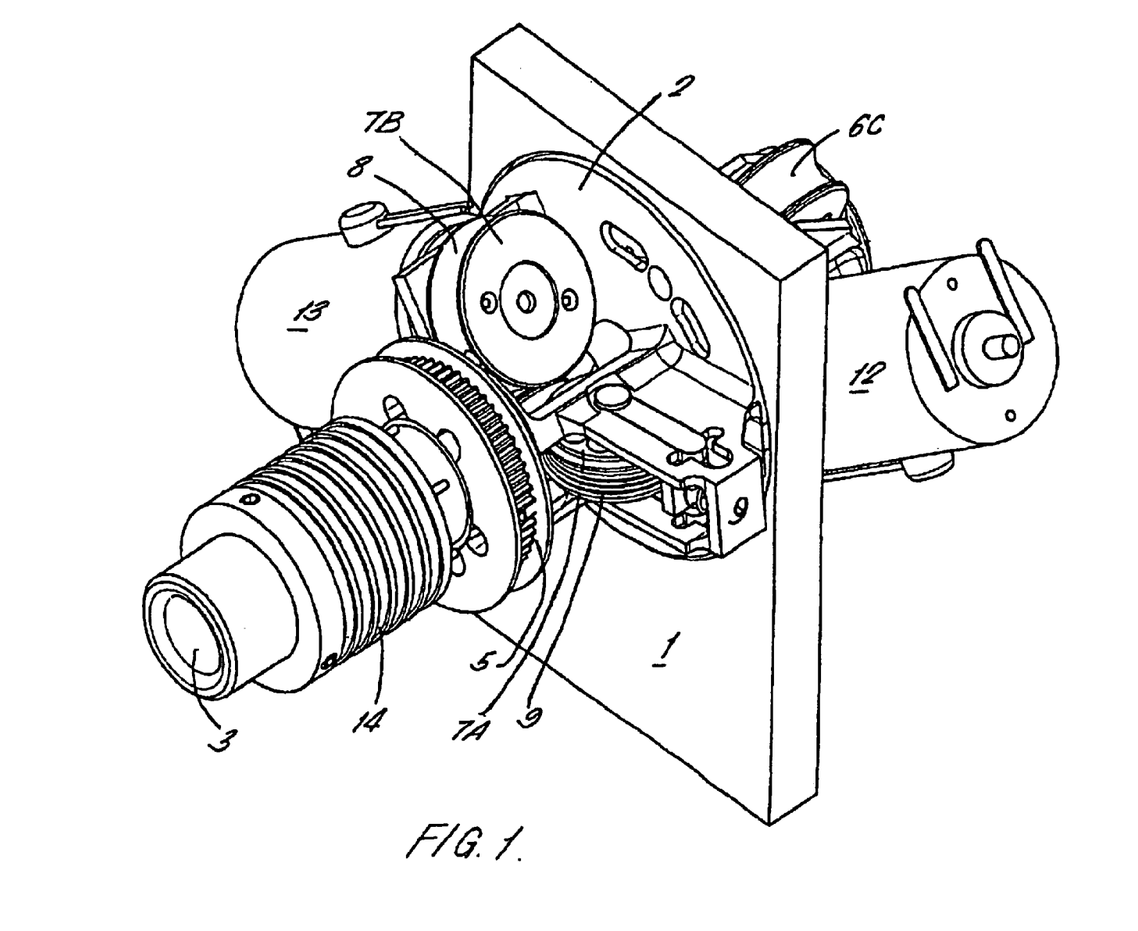
FIG. 1 is a perspective view of the force feedback apparatus.
Figure 2:
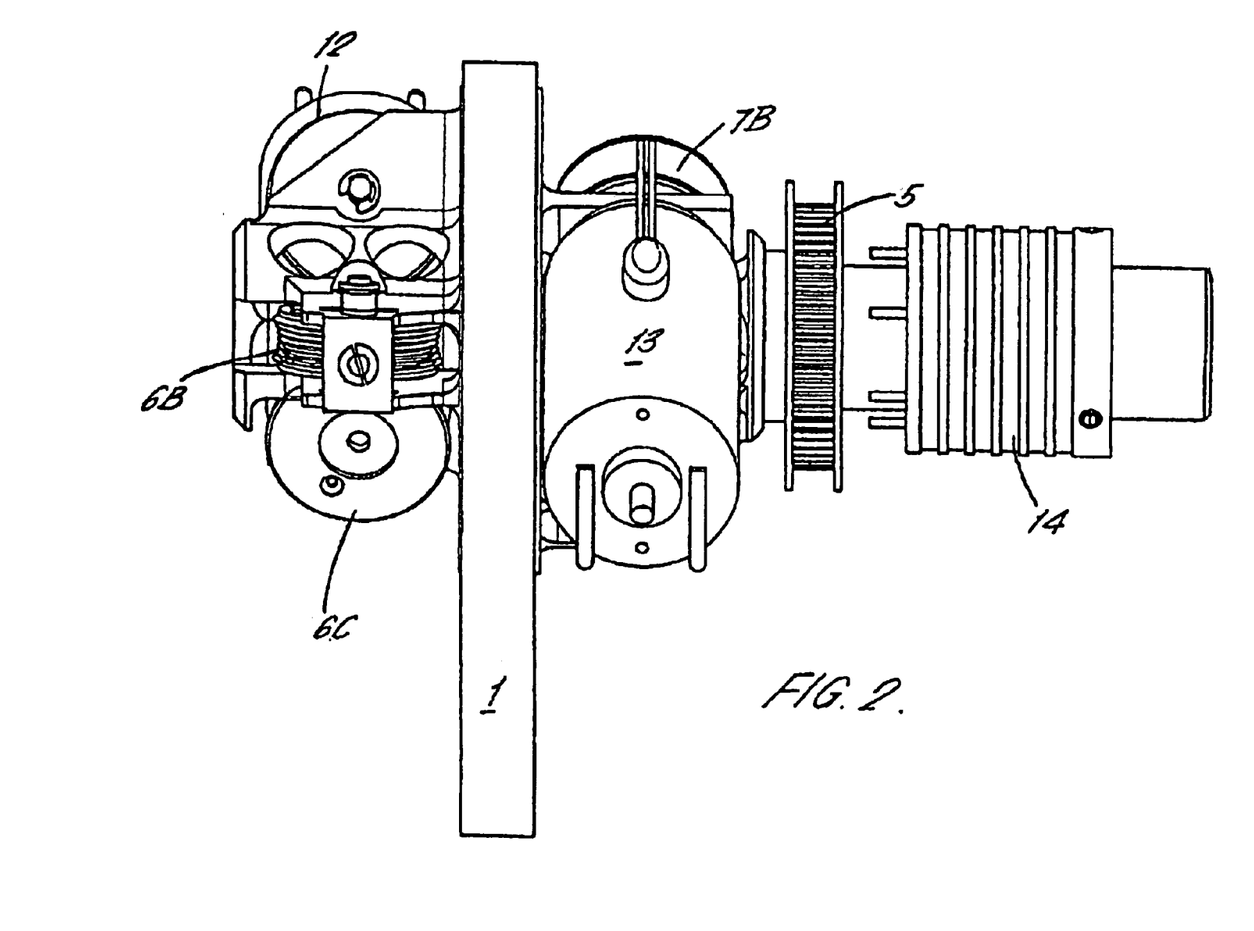
FIG. 2 is a side view of the force feedback apparatus viewed from the opposite of FIG. 1.
Figure 3:
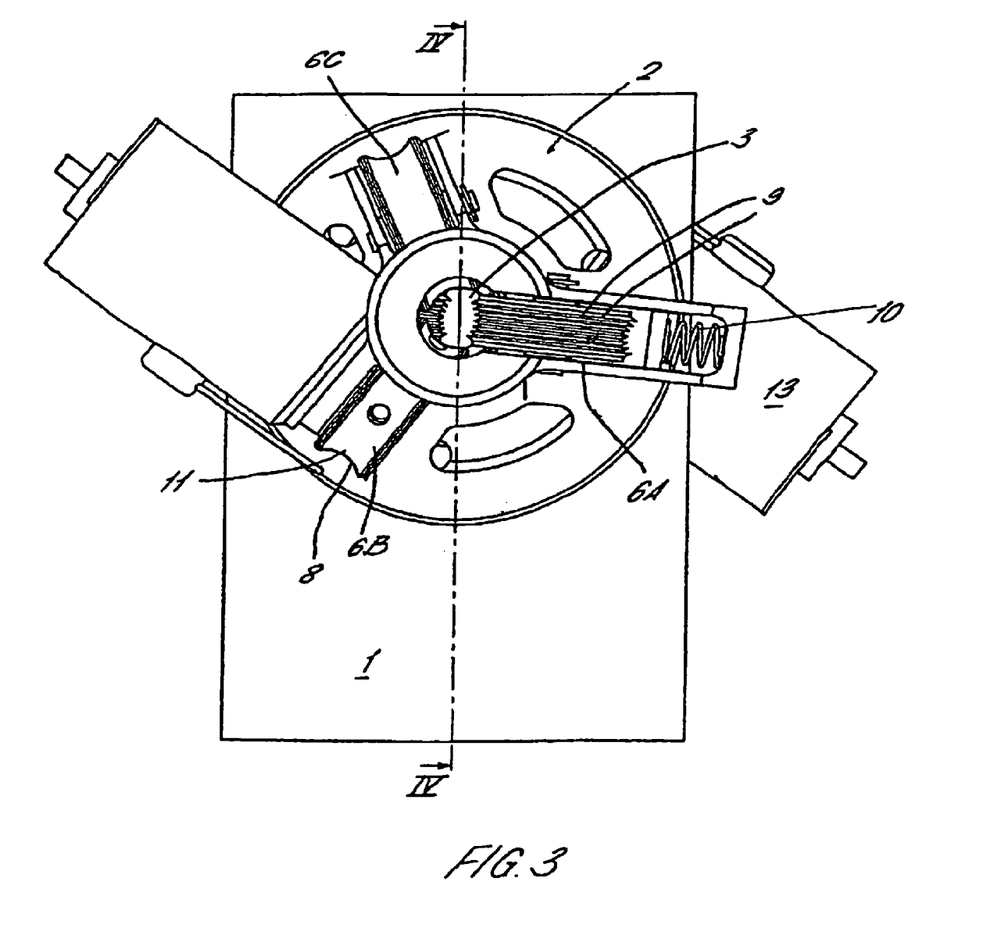
FIG. 3 is an end view of the force feedback apparatus.

The first set of rollers 6 comprises a first 6A, a second 6B and third 6C rollers equally spaced about the axis 4. Each roller is rotatable about an axis perpendicular to the axis 4. The rollers have a concave profile 8 and are arranged such that they will substantially surround the insertion tube extending along the axis 4 as best shown in FIG. 3.

The first roller 6A comprises a number of sharp edged circumferentially extending ridges 9. The first roller 6A is also spring-loaded by a spring 10 which urges it towards the axis 4. The arrangement shown in FIG. 3 shows the assembly without an insertion tube present in which the first roller 6A extends further towards the axis 4 than the second 6B and third 6C rollers. When the insertion tube is inserted it pushes the first roller 6A away from the axis 4 against the action of the spring 10.

The insertion tube engaging surface 11 of the second roller 6B is rubber coated. The second roller 6B is attached to a first force feedback motor 12 which can provide a torque to the second roller 6B to resist rotary motion of the second roller, and hence provide resistance to linear insertion of the insertion tube.

The third roller 6C is similar to the second roller 6B in that it is similarly rubber coated. However, the third roller is simply an idler roller which is not connected to a feedback motor.

The second set of rollers 7 comprises first 7A, second 7B and third 7C rollers all of which are as described above with regard to the first set of rollers. The second roller 7B is attached to a second force feedback motor 13. However, the second set of rollers is angularly offset about the axis 4 by 180°. This has the effect of offsetting the first force feedback motor 12 from the second force feedback motor 13 by 180° about the axis 4. Thus, the disk 2 is balanced for rotational movement without having to employ separate counterbalance weights.

A number of annular contacts 14 which rotate with the assembly mounted on the disk 2 are provided. These are in sliding contact with a number of electrical pick-ups 15 (FIG. 8) to allow data transfer to and from the rotating assembly.

In use, when the insertion tube is inserted into the duct 3 along axis 4, it passes through the two sets 6, 7 of rollers. Longitudinal motion of the insertion member causes rotation of all six rollers. When the simulation software detects that feedback to the longitudinal movement is required, the torque provided by the motors 12, 13 is increased.

When the insertion tube is rotated, all of the above described apparatus mounted on the disk 2 is rotated with the tube. Force feedback against this rotation may be provided through the pulley 5. At this time, any slippage of the insertion tube across the face of the two sets of wheels 6, 7 is prevented firstly by the fact that the load is spread between the two sets of wheels, and secondly by the fact that the ridges 9 grip the insertion tube as it is rotated.

FIGS. 5 to 8 illustrate the force feedback mechanism as shown in FIGS. 1 to 4, together with the sensing mechanism as will now be described.

The sensing mechanism is mounted on a second fixture 20 and has a similar three roller configuration to one of the sets of rollers on the force feedback mechanism. In particular, the sensor comprises three rollers 21A, 21B, 21C mounted on a disc 22 which is rotatable about axis 4. A pulley 23 is rotatable with the disc 22 and a belt 24 couples pulley 23 a second pulley 25 of an optical encoder 26. Thus, as the insertion tube is rotated the rotation is transmitted by the wheels 21A–C to disc 22 and hence by the belt 25 to the optical encoder 26 allowing the rotary position of the tube to be detected.

As mentioned above, the three rollers 21A–C have a similar configuration to the rollers 6, 7 on the force feedback assembly. In particular, the first sensor roller 21A is provided with circumferential grooves 27 similar to the grooves 9 on rollers 6A and 7A. This roller is also spring loaded into engagement with the insertion tube by a spring assembly 28. The second 21B and third 21C sensor rollers are of the same construction as the second and third rollers of the feedback mechanism. In particular, they do not have grooves, but are rubber coated. In this case, no motor is present. Instead, an optical encoder 28 is provided to detect the rotation of the third sensor roller 21C and hence to provide an indication of the linear position of the insertion tube. A number of annular contacts 29 and associated pick-ups 30 allow the transfer of this sensed information from the rotating assembly.

Figure 6:
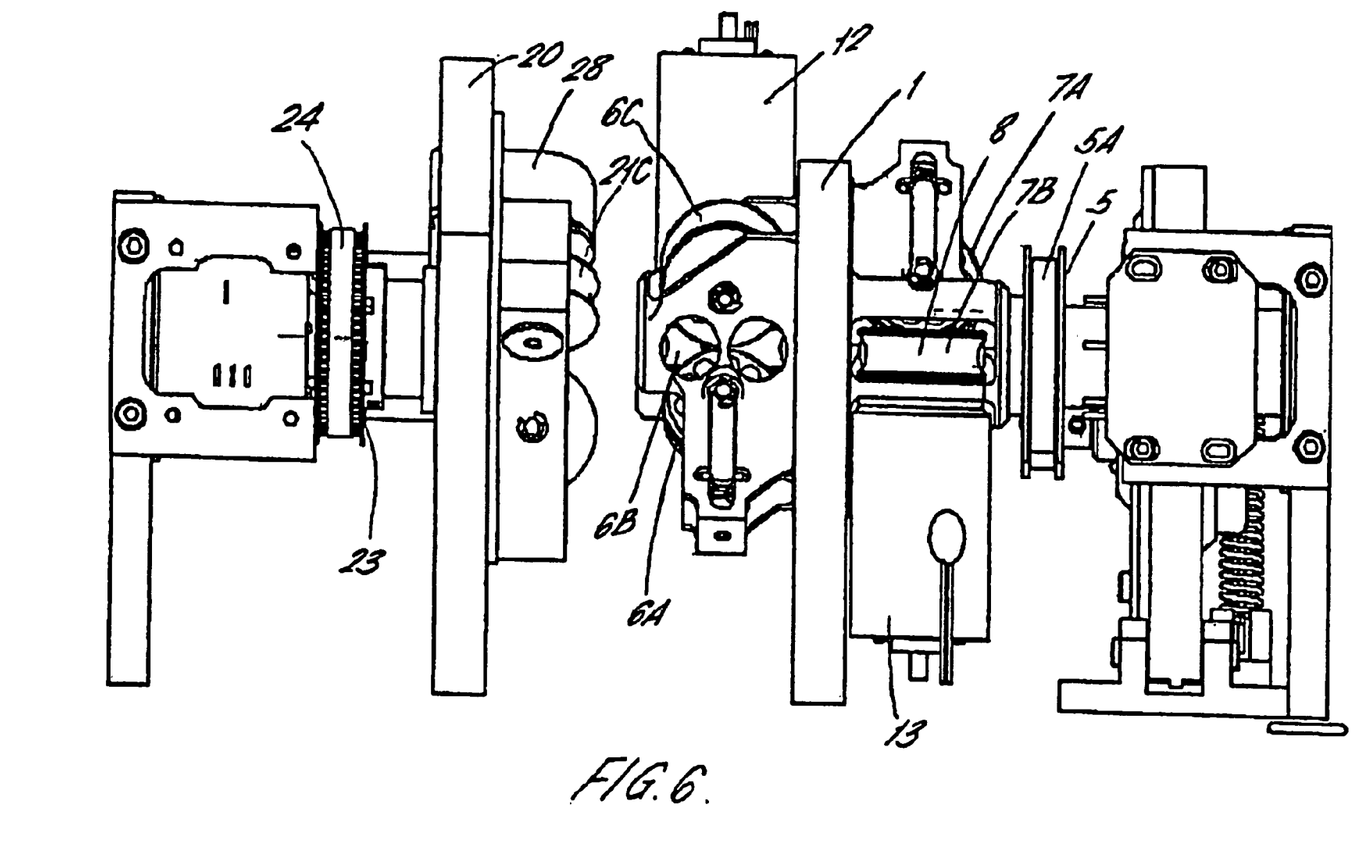
FIG. 6 is a side view of the apparatus of FIG. 7.
Figure 7:
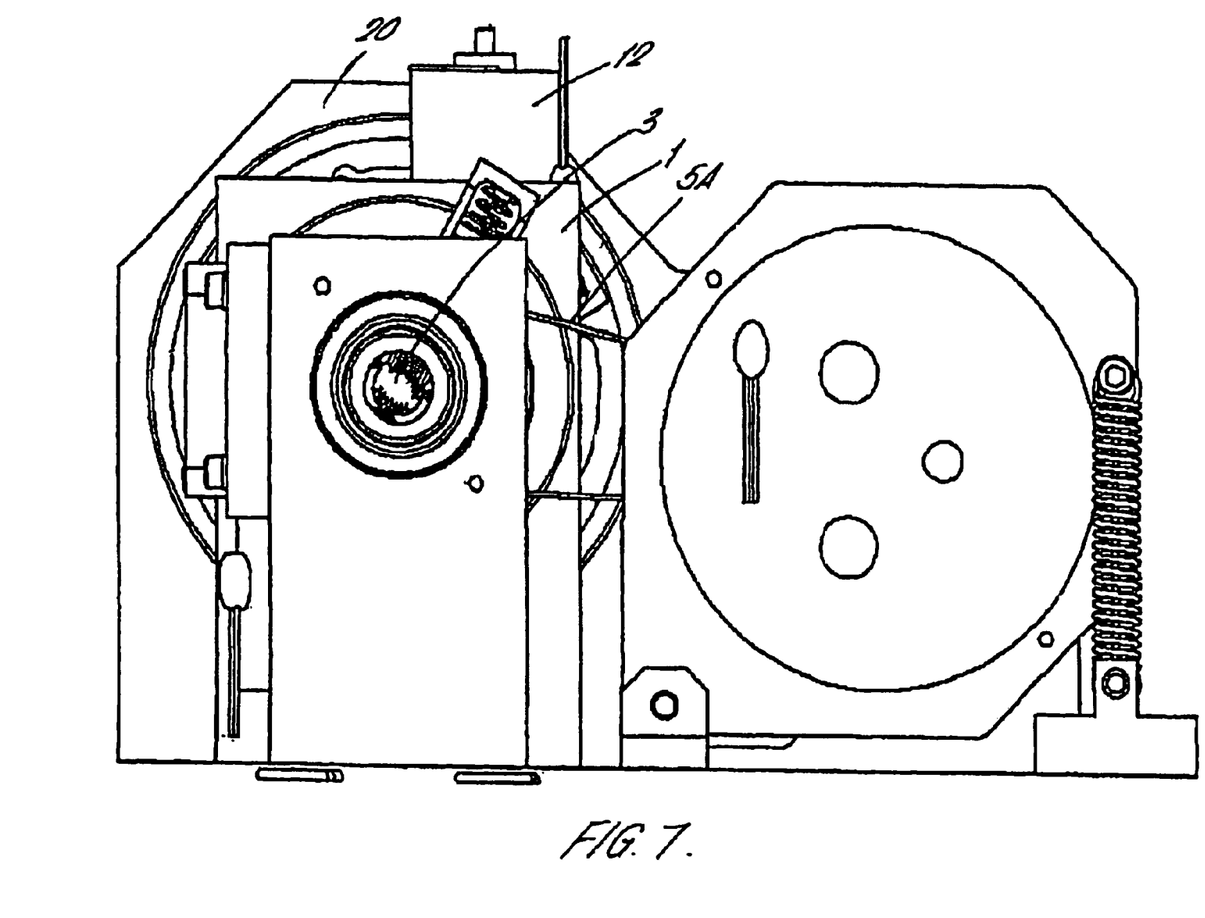
FIG. 7 is an end view from the right hand end of FIG. 5.

The insertion tube is first inserted from the right hand side as shown in FIG. 6 so that it initially encounters the second set of force feedback rollers 7A–C, followed by the first set of force feedback rollers 6A–C and finally the sensor rollers 21A–C. The insertion tube must therefore be inserted for some considerable distance before it engages with the sensing arrangement. Only then is the simulator aware of the position of the insertion tube, and only then can the simulation begin. For this reason, the insertion tube is preferably provided with a marker spaced from its distal end at a distance corresponding to the distance between the entrance for the insertion tube into the force feedback apparatus and the position of the sensing rollers 21A–C. Thus, the insertion tube must be inserted until the marker is level with the entrance to the assembly, at which point the position of the insertion tube will be sensed. For the purposes of the simulation, the part of the insertion tube which is distal of the marker will be ignored, and the operator will start the simulation at the point where the marker is level with the entrance as though he/she were just inserting the endoscope into a bodily orifice.

What is claimed is:

1. An apparatus for use for training an operator in the use of an endoscope system comprising a dummy endoscope having an insertion tube; a fixture defining a duct receiving, in use the insertion tube; sensor means responsive to manipulation of the dummy endoscope to provide signals representative of longitudinal and rotational movement of the insertion tube relative to the fixture; and simulation means responsive to the signals to generate an operator viewable image simulating the image which would be viewable using the endoscope when manipulated in like manner during an endoscopic procedure, wherein the simulation means further comprises tactile means independent of the sensor means and operable between the fixture and the insertion tube so as to provide a corresponding tactile feedback to the operator; wherein the tactile means comprises means to impart linear and rotational force feedback independently of one another, including a set of rollers spaced circumferentially around the duct such that the periphery of each roller engages, in use, the insertion tube and each roller is rotatable upon longitudinal movement of the tube; the rollers being arranged to grip the tube and being mounted on a disc which is rotatable upon rotational movement of the tube, a first force feedback mechanism for generating proportional resistance to rotation of at least one roller so as to provide force feedback against the longitudinal motion of the tube, and a second force feedback mechanism for generating proportional resistance to rotation of the disc so as to provide force feedback against the rotational movement of the tube, wherein the rollers are configured to grip the tube so as to substantially eliminate slippage between the tube and the disc as the tube is rotated.

2. An apparatus according to claim 1, wherein at least one of the rollers is spring loaded by a spring which tends to urge it into engagement with the tube.

3. An apparatus according to claim 2, wherein the at least one roller is provided with circumferential ridges to grip the tube.

4. An apparatus according to claim 3, wherein the ridges have sharp edges.

5. An apparatus according to claim 3 or claim 4, wherein the at least one roller provided with circumferential ridges is rigid, while the remaining rollers are rubber coated.

6. An apparatus according to claim 1, wherein the rollers have a concave profile, such that the rollers engage with the majority of the circumference of the tube.

7. An apparatus according to claim 1, further comprising a second set of three rollers spaced circumferentially around the duct and such that the periphery of each roller engages, in use, the insertion tube, and each roller is rotatable upon longitudinal movement of the tube; the second set of rollers being arranged to grip the tube and being mounted on a second disc which is rotatable upon rotational movement of the tube; wherein one roller on each disc is connected to a motor which is arranged to generate force feedback to the roller to provide resistance to longitudinal movement of the tube, the two motors being mounted at diametrically opposed locations with respect to the axis of the tube.

8. An apparatus according to claim 1, in combination with a flexible endoscope providing the dummy endoscape.

9. An apparatus according to claim 1, wherein the tactile means and sensor means are mounted on separate fixtures.

10. An apparatus according to claim 1, wherein the sensor means comprises a set of sensor rollers spaced circumferentially around the duct such that the periphery of each, roller engages, in use, the insertion tube and each roller is rotatable upon longitudinal movement of the tube; the rollers being arranged to grip the tube and being mounted on a disc which is rotatable upon rotational movement of the tube.

* * * * *